United States Patent
Kanada et al.

(10) Patent No.: US 7,576,945 B2
(45) Date of Patent: Aug. 18, 2009

(54) DISK DRIVE WITH AN AIR FLOW PASSAGE WITHIN ENCLOSURE TO REDUCE FLUTTER

(75) Inventors: Naoaki Kanada, Kanagawa (JP); Kohichi Takeuchi, Kanagawa (JP)

(73) Assignee: Hitachi Global Storage Technologies Netherlands B.V., Amseterdam (NL)

( * ) Notice: Subject to any disclaimer, the term of this patent is extended or adjusted under 35 U.S.C. 154(b) by 471 days.

(21) Appl. No.: 11/304,398

(22) Filed: Dec. 14, 2005

(65) Prior Publication Data
US 2006/0139796 A1 Jun. 29, 2006

(30) Foreign Application Priority Data
Dec. 27, 2004 (JP) ............... 2004-376847

(51) Int. Cl.
*G11B 33/14* (2006.01)
(52) U.S. Cl. .................. 360/97.02; 360/254.7
(58) Field of Classification Search .......... 360/97.02, 360/254.7–255
See application file for complete search history.

(56) References Cited

U.S. PATENT DOCUMENTS 5,204,793 A * 4/1993 Plonczak ............. 360/97.01
6,369,977 B1 * 4/2002 Imai et al. ............. 360/97.02
2001/0043441 A1 * 11/2001 Kishi et al. ........... 360/254.8
2002/0071203 A1 * 6/2002 Nakamoto et al. ..... 360/97.02
2003/0058575 A1 * 3/2003 Imai et al. ............. 360/97.02

FOREIGN PATENT DOCUMENTS

JP 2002-133827 5/2002

* cited by examiner

*Primary Examiner*—A. J. Heinz
(74) *Attorney, Agent, or Firm*—Townsend and Townsend and Crew LLP; Darren Gold

(57) ABSTRACT

Turbulence of an airflow returning to a magnetic disk along the base sidewall of a HDD is reduced to thereby reduce flutter of an actuator or a magnetic disk caused by the airflow, thus improving read/write performance. An HDD according to an embodiment of the present invention comprises a base, a top cover fixed to the base, a motor for rotating a magnetic disk, an actuator for moving a head which gets access to the magnetic disk, a ramp slope portion on which an extreme end is ridden up, a ramp support portion for supporting the ramp slope portion, and a stage for holding the ramp support portion. A flow passage is formed which runs toward the magnetic disk through an area near the ramp support portion on the side of the top cover. An inclined portion running toward the bottom of the base is formed on the end of the flow passage on the side of the magnetic disk.

18 Claims, 8 Drawing Sheets

(a)

(b)

(a)

(b)

US 7,576,945 B2

DISK DRIVE WITH AN AIR FLOW PASSAGE WITHIN ENCLOSURE TO REDUCE FLUTTER

CROSS-REFERENCES TO RELATED APPLICATIONS

This application claims priority from Japanese Patent Application No. JP2004-376847, filed Dec. 27, 2004, the entire disclosure of which is incorporated herein by reference.

BACKGROUND OF THE INVENTION

The present invention relates to a magnetic disk drive, and more particularly to airflow control within the enclosure thereof.

Data storage devices using various types of media such as optical disks and magnetic tapes are known. Among them, hard disk drives (HDDs) have become popular as storage devices for computers to such an extent that they are one type of the storage devices indispensable for today's computers. Further, not limited to computers, HDDs are expanding more and more in application because of its excellent characteristics. For example, HDDs are used for moving picture recording/reproducing devices, car navigation systems, cellular phones, removable memories used in digital cameras and so on.

Each magnetic disk used in HDDs has a plurality of tracks formed concentrically and each track is partitioned into a plurality of sectors. Servo data and user data are stored in each sector. A spindle motor rotates a magnetic disk, and a head element as a thin film element makes access to a desired address position in accordance with the servo data of a sector, whereby it is possible to effect write or read of data to or from the magnetic disk.

A head element portion is fixed to a slider, both constituting a head. The slider is adapted to fly over a rotating magnetic disk, whereby the head or head element can be moved to a desired position over the magnetic disk. In a data read operation, a signal read from the magnetic disk by the head element is subjected to predetermined signal processing such as waveform shaping or decoding in a signal processing circuit and is sent to the host. Data transferred from the host is subjected to predetermined signal processing in the signal processing circuit and is then written to the magnetic disk.

In HDDs, an airflow generated by the rotation of the magnetic disk poses a problem. For example, the airflow flutters the actuator to impair accurate positioning of the head. To overcome this disadvantage, Patent Document 1 (Japanese Patent Laid-open No. 2002-133827) discloses an example in which a bypass channel through which the airflow passes is provided between a ramp and the sidewall of a base.

In addition thereto, fluttering of the magnetic disk (disk flutter) caused by the turbulence of the airflow generated by the rotation of the magnetic disk poses a problem. The disk flutter impairs accurate positioning of the head to the track, similarly to the flutter of the head itself. In particular, as the recording density of the magnetic disk increases so that TPI (Track Per Inch) becomes high, more accurate positioning of the head is required, and even a slight disk flutter poses a problem.

BRIEF SUMMARY OF THE INVENTION

FIG. 8 enlargedly shows a ramp 2 and its periphery in a conventional HDD 1. Airflow along a sidewall of a base 3 passes through as indicated by arrow in the figure between the ramp 2 and the base 3. The base 3 in the conventional HDD 1 has a convex portion 31 as shown in FIG. 8 along the shape of the magnetic disk (not shown). The convex portion 31 facilitates airflow in the circumference of the magnetic disk, but it blocks an airflow moving toward the magnetic disk passing between the ramp 2 and the sidewall of the base 3, generating the turbulence of the airflow.

In particular, the airflow is interrupted by the convex shape 31 at the position indicated by the arrow, that is, between the ramp 2 and the sidewall of the base 3, and therefore the airflow along the sidewall of the base 3 passes inside the ramp 2. Since the inside of the ramp 2 is used to support the actuator (not shown), the airflow passing through the space causes the actuator to flutter. Further, in an HDD having a plurality of stacked magnetic disks, an airflow passes through between the magnetic disks. The actuator flying over the disk surface blocks the airflow passing through between the magnetic disks to generate the turbulence of the airflow. Such a turbulence of airflow causes the magnetic disks and the actuator to flutter, impairing accurate positioning of the actuator on the magnetic disk surface.

To overcome such a problem, an effective solution is to secure a passage of an airflow passing through between the ramp 2 and the sidewall of the base 3. According to the method disclosed in Patent Document 1, a space 4 is provided between the sidewall of the base 3 and the ramp 2 (FIG. 9). The ramp 3 is not fixed to the sidewall of the base 3, but a stage 5 for fixing the ramp 2 to the bottom of the base 3 is provided apart from the sidewall of the base 3. By the provision of such a structure as described, the space 4 is provided whereby a passage of an airflow along the sidewall of the base 3 can be secured.

However, the shape and size of HDD 1 is limited based on the standards. In addition, HDD 1 is in the tendency toward miniaturization. Then it is particularly difficult to change the size and shape of the base 3. Further, since a position at which the ramp 2 is formed is also associated with the length of the actuator, it cannot be changed easily. Where for example, the actuator is changed in length, the turning radius of the actuator changes to affect the positioning of the head element portion. As described, the conventional HDD has no margin in terms of dimension and design for providing the space 4 as shown in FIG. 9, and it is difficult to realize such a solution.

The present invention has been accomplished in consideration of the above-described circumstances. A feature of the present invention is to reduce the turbulence of an airflow returning to a recording disk in the vicinity of a ramp of a disk drive.

A first aspect of the invention provides a disk drive comprising: an enclosure having a base and a top cover fixed to the base; a motor arranged internally of the base to rotate a recording disk; an actuator holding a head getting access to the recording disk, the actuator being turned to thereby move the head; a ramp slope portion which is located beside the recording disk, and on which an extreme end of the actuator is ridden up in order to move the head outside the recording disk; a ramp support portion for supporting the ramp slope portion; and a stage provided in the enclosure and adapted to fix the ramp support portion thereto; wherein a flow passage through which air flows to the recording disk through an area near the ramp support portion on the side of the top cover is formed between the ramp slope portion and the enclosure, and an inclined surface running toward the bottom of the base is formed on an end of the flow passage on the side of the recording disk. With such a configuration, it is possible to secure the flow passage of an airflow returning to the magnetic disk along the base sidewall, which can reduce an airflow passing the area near the ramp on the side of the ramp slope portion.

Preferably, the inclined portion is a slope whose height from the base bottom reduces continuously. Thus, the expansion of the space can be made to be continuous, whereby it is possible to avoid rapid enlargement of the flow passage.

Further, preferably, a plurality of recording disks are fixed to the motor, and an extreme end of the slope is positioned at a height between a surface of a recording disk closest to the top cover out of the plurality of recording disks fixed to the motor and a surface of a recording disk closest to the base bottom out of the plurality of recording disks. Thus, it is possible to reduce the flutter of the magnetic disk caused by the airflow returning to the magnetic disk.

More preferably, the extreme end of the slope is positioned at the height which substantially corresponds to the surface, of the recording disk fixed to the motor, on the side of the top cover. Thus, it is possible to reduce further suitably the flutter of the magnetic disk caused by the airflow returning to the magnetic disk.

Further, preferably, a flow passage adapted for an airflow returning to the magnetic disk is formed between the stage and the base bottom. Thus, it is to possible to further reduce the turbulence of the airflow in the vicinity of the ramp support portion.

Preferably, the stage is formed integral with the base sidewall, and the slope is formed on the side end of the recording disk of the stage. Thereby, it is possible to easily design and assemble the hard disk drive.

A second aspect of the invention provides a disk drive comprising: an enclosure having a base and a top cover fixed to the base; a motor arranged internally of the base to rotate a recording disk; an actuator holding a head getting access to the recording disk, the actuator being turned to thereby move the head; a ramp which is located beside the recording disk, and on which an extreme end of the actuator is ridden up in order to move the head outside the recording disk; and a stage provided in the enclosure and adapted to fix the ramp thereto; wherein a flow passage through which an airflow returns to the recording disk is formed in an area near the stage on the side of the base bottom. With such a configuration, it is possible to secure a flow passage of an airflow returning to the magnetic disk along the sidewall of the base, which can reduce the amount of airflow passing the area near the ramp on the side of the ramp slope portion.

Preferably, the ramp comprises a ramp slope portion on which an extreme end of the actuator is ridden up, and a ramp support portion supporting the ramp slope portion and fixed to the stage; wherein a flow passage through which air flows toward the recording disk through an area near the ramp support portion and the stage on the side of the top cover is formed between the ramp slope portion and the sidewall of the base, and a slope whose height from the base bottom reduces continuously is formed on an end of the flow passage on the side of the recording disk. Thus, it is possible that the expansion of the space be continuous whereby sudden enlargement of the flow passage can be avoided.

Further, preferably, a plurality of recording disks are fixed to the motor; and an extreme end of the slope is positioned at a height between a surface of a recording disk closest to the top cover out of the recording disks fixed to the motor and a surface of a recording disk closest to the base bottom out of the recording disks. Thus, it is possible to reduce the flutter of the magnetic disk caused by the airflow returning to the magnetic disk.

Further, preferably, the stage is formed integral with the base sidewall, and the slope is formed on an end of the stage on the side of the recording disk. Thus, it is possible to easily design and assemble the hard disk drive.

According to the present invention, it is possible to reduce the turbulence of an airflow returning to the recording disk in the vicinity of the ramp portion of the disk drive.

DETAILED DESCRIPTION OF THE INVENTION

Figure 1:
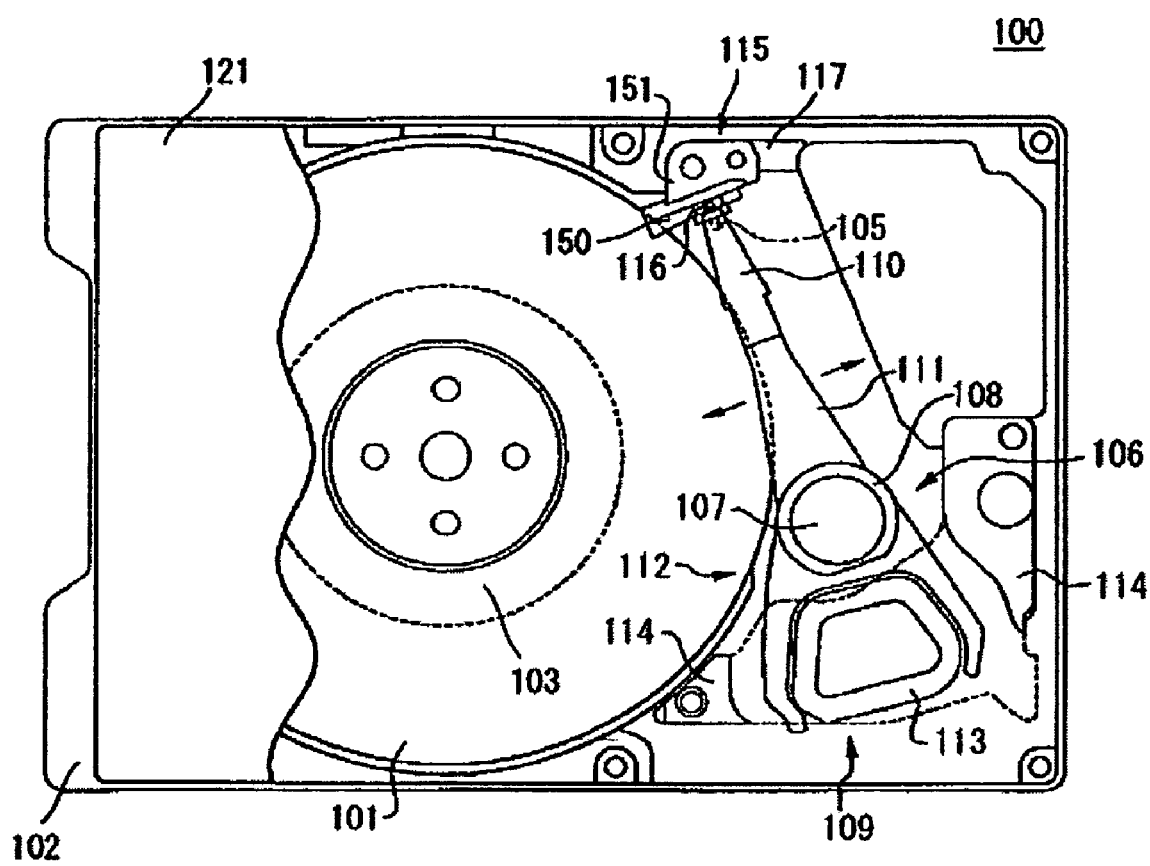
FIG. 1 is a plan view showing the whole hard disk drive according to an embodiment of the present invention.

Specific embodiments to which the present invention can be applied will be described hereinafter. For the sake of clarification of description, the following description and drawings are suitably simplified and certain details omitted. Further in the drawings, the same elements are indicated by the same reference numerals, and for the sake of clarification of description, repeated explanation is omitted as appropriate.

The specific embodiments to which the present invention is applied will be described with reference to the drawings. The present invention relates to the construction of the circumference of a ramp, particularly of a stage adapted to fix the ramp in a disk drive according to the present invention. To facilitate understanding of the present invention, first, the whole structure of a hard disk drive (HDD), which is one example of the disk drive, will be described. FIG. 1 is a plan view schematically showing the structure of an HDD 100 according to the present embodiment. In FIG. 1, reference numeral 101 denotes a recording medium for storing data, which is a magnetic disk as a non-volatile recording disk for storing data by magnetizing a magnetic layer. Numeral 102 denotes a base adapted to house structural elements of the HDD 100. The base 102 and a top cover 121 which closes the upper opening of the base 102 and which is fixed to the base 102 through a gasket (not shown) constitutes a disk enclosure, in which structural elements of the HDD 100 can be housed in a closed state.

The magnetic disk 101 is fixed to a spindle motor 103. The spindle motor 103 rotates the magnetic disk 101 at a predetermined speed. A head 105 includes a slider, and a head element portion as a conversion element fixed to the surface of the slider. The head element portion writes and/or reads data to and/or from the magnetic disk 101, the data being input and output between a host (not shown) and the head element. The head element portion has a recording element for converting an electrical signal to a magnetic field according to storage data to the magnetic disk 101 and/or a read element for converting a magnetic field from the magnetic disk 101 to an electrical signal.

An actuator 106 is held on a pivot 107 for turning, and driven by a VCM (Voice Coil Motor) 109. The actuator 106 turns the head 105 to thereby position it to a desired position on the magnetic disk 101. The actuator 106 and the head 105 constitute a head actuator assembly. The actuator 106 includes structural members, i.e., a suspension portion 110, an arm portion 111, a fitting portion to which a turning shaft 107 is fitted, a coil support portion 112, and a flat coil 112, which are connected to one another in this order from an extreme end at which the head 105 is attached.

Numeral 114 denotes an upper stator magnet holding plate fixed to the base 102. The upper stator magnet holding plate 114 is shown with its main part cut away for the sake of convenience, the outer shape of which is shown with a broken line. Although not shown, a lower stator magnet holding plate is disposed under the flat coil 113 so as to put the flat coil 113 between the lower stator magnet holding plate and the upper stator magnet holding plate 114. The VCM 109 includes the flat coil 113, a stator magnet (not shown) fixed to the upper stator magnet holding plate 114, and a stator magnet (not shown) fixed to the lower stator magnet holding plate.

Numeral 115 denotes a ramp on which the head 105 unloaded from the magnetic disk 101 is rested when the magnetic disk 101 stops to rotate. As shown in the figure, the ramp 115 is located beside the magnetic disk 101. Numeral 116 denotes a tab formed at the extreme end of the suspension portion 110. The ramp 115 in the present embodiment has a ramp slope portion 150 adapted to support the tab 116 and a ramp support portion 151 for fixing the ramp 115 to the base 102. The ramp slope portion 150 is formed to project to the surface of the ramp support portion 151 on the side of the actuator 106. Further, a stage 117 for fixing the ramp support portion 151 projects from the sidewall of the base 102 at that portion. The structure of the ramp 115 and the circumferential portion thereof will be described later.

The HDD 100 can be provided with one or a plurality of stacked magnetic disks 101. Where a plurality of magnetic disks 101 are provided, a spindle motor 103 holds a plurality of magnetic disks 101 integrally in a predetermined spacing relation in a direction of the rotational axis thereof. In the present embodiment, three magnetic disks are stacked at predetermined intervals. Typically, data are stored on both surfaces of the magnetic disk 101, but data can be stored on only one surface.

To read and write data from and to the magnetic disk 101, the actuator 106 moves the head 105 above a data area of the surface of the rotating disk 101. The pivotal movement of the actuator 106 moves the head 105 in the radial direction of the surface of the magnetic disk 101. This causes the head 105 (head element portion) to access a desired track. Pressure caused by viscosity of air between the surface of ABS (Air Bearing Surface) of a slider opposite to the magnetic disk 101 and the rotating magnetic disk 101 balances with pressure applied in the direction of the magnetic disk by the suspension portion 110 whereby the head 105 flies above the magnetic disk 101 with a fixed gap.

When rotation of the magnetic disk 101 stops, the actuator 106 withdraws the head 105 from a data region to the ramp slope portion 150 of the ramp 115. The actuator 106 turns in the direction of the ramp 115, and the tab 116 at the extreme end of the actuator 105 slidably moves on the ramp slope portion 150 to rest on the parking surface of the ramp 115. Thus, the head 105 is unloaded. In loading, the actuator 106 supported on the parking surface is disengaged from the ramp 115 and moved to above the surface of the magnetic disk 101.

In such an HDD 100, the magnetic disk 101 rotates counterclockwise to thereby generate a counterclockwise airflow along the sidewall of the base 102. The airflow generated around the magnetic disk 101 turns counterclockwise along the sidewall of the base 102, passing through from right to left in the figure near the ramp 115, and returns to the magnetic disk 101. At that time, the airflow passes an area near the ramp 115 on the side of the actuator 105, that is, near the ramp slope portion 150 of the ramp 15. This causes the actuator 106 or the magnetic disks 101 to flutter. Accordingly, it is necessary to secure a passage for the airflow, that is, a flow passage between the ramp 115 and the sidewall of the base 102.

Figure 2:
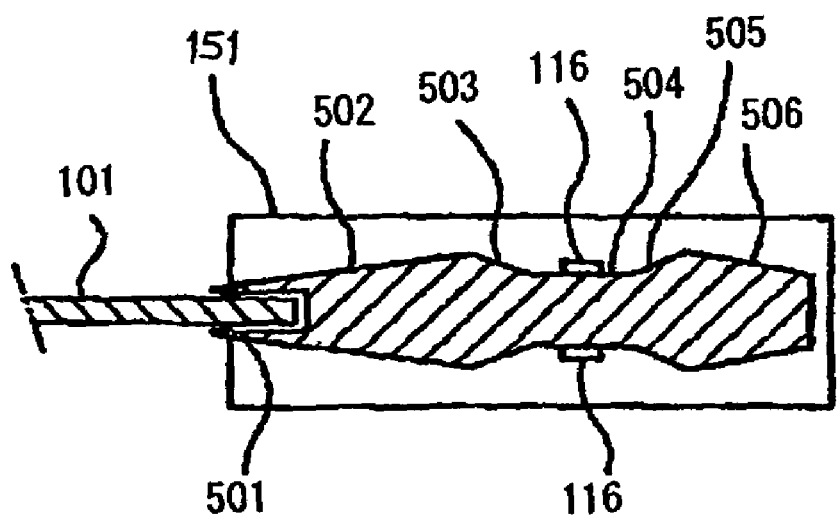
FIG. 2 is a schematic view showing a ramp slope portion and an actuator held on the ramp slop portion according to the embodiment of the present invention.
Figure 2:
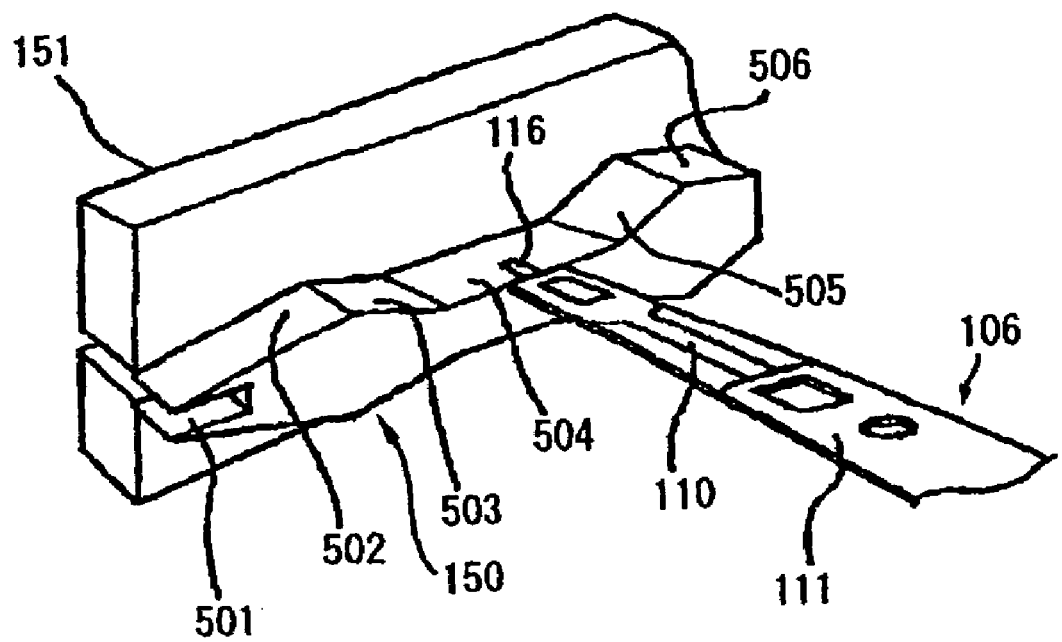

FIG. 2 is an enlarged view showing part of the ramp support portion 151 and the ramp slope portion 150 connected to the ramp support 151. FIG. 2 shows a state where the actuator 106 is unloaded to the ramp slope portion 150 which is a withdrawn position on the ramp 115. It is noted that FIG. 2(*a*) shows two tabs 116 of the suspension portions 110 and arm portions 111, and FIG. 2(*b*) shows one suspension portion 110 and arm portion 111. The ramp slope portion 150 has a slit 501 through which the outer circumference of the rotating magnetic disk 101 passes, a parking portion 504, and a slope continuous to the parking portion 504 for supporting the tab 116. The slope continuous to the parking portion 504 includes a slope 502, a slope 503, a slope 505, and a slope 506.

When the actuator 106 is unloaded from the data region, the actuator 106 turns in the direction of the ramp 115, and the tab comes in contact wit the ramp slope portion 150, as mentioned above. The tab 116 comes in contact with the slope 502 in the ramp slop portion 150, and moves up along the slope 502. After completely moving up the slope 502, the tab moves down along the slope 503. After completely moving down the slope 503, the tab lands on the parking surface 504. Accordingly, when the actuator 106 is unloaded at a withdrawn position, the tab 116 is in contact with the parking surface 504. With the function of the slope 503, the actuator 106 is not loaded on the data region on the magnetic disk 101 unless the drive force of the VCM 109 is activated. The slopes 505 and 506 are formed for insertion of the tab 116 from the rear portion (opposite the slit 501) of the ramp slope portion 150 when the actuator is mounted.

Figure 3:
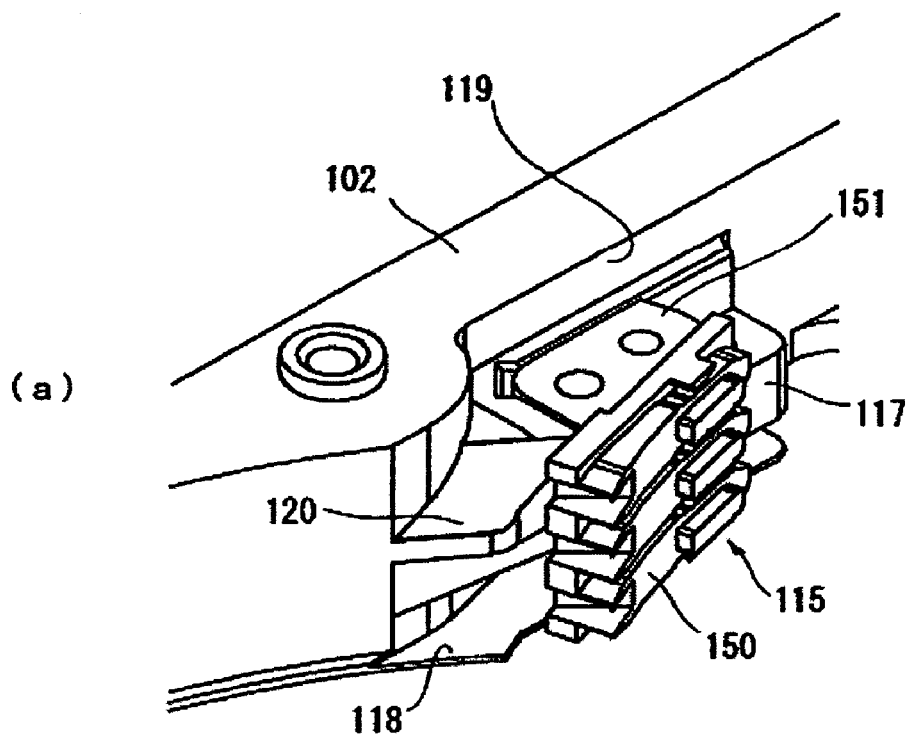
FIG. 3 is an enlarged perspective view showing a ramp and the neighborhood of a part to which the ramp is fixed according to the embodiment of the present invention.
Figure 3:
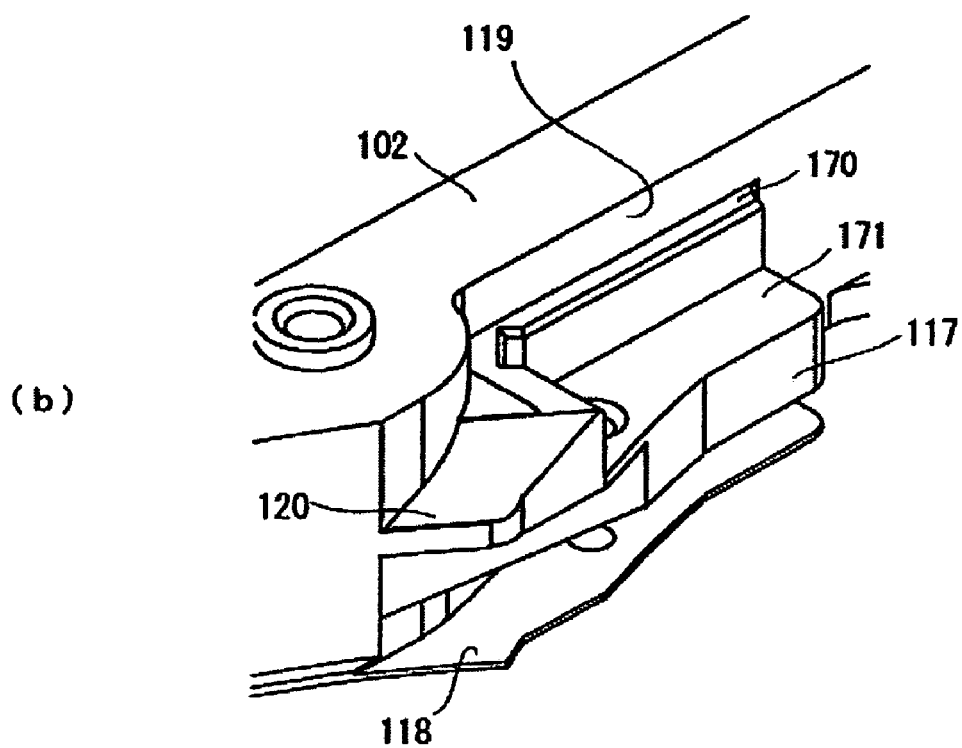

FIG. 3(*a*) is a perspective view schematically showing the ramp 115 and the circumference thereof in the present embodiment. However, the magnetic disk 101 is omitted and not depicted. FIG. 3 shows ramps appropriate for three magnetic disks 101, and three ramp slope portions shown in FIG. 2 are arranged longitudinally. While in FIG. 2, a description has been made such that a set of the slit 501, the parking surface 504 and each slope constitute the ramp slope portion 150 as one unit, it is noted that in the present embodiment, three sets of the units described above are designated as a ramp slope portion 150.

The ramp slope portion 150 and the ramp support portion 151 may be formed integrally as the same member, or may be constituted by separate members and assembled later. The ramp slope portion 150 has a function of holding the extreme end of the actuator 106 when rotation of the magnetic disk 101 stops and the actuator 106 is unloaded, as mentioned above. The structures of the slope 502 and the parking surface 504 shown in FIG. 2 are provided on a surface of the ramp slope portion 150 opposite to the sidewall of the base 102, that is, the surface nearer the magnetic disk 101 of the HDD 1.

FIG. 3(*b*) shows a perspective view of a state where the ramp 115 is removed at the same part as the part shown in FIG. 3(*a*). A stage 117 adapted to hold the ramp support portion 151 is formed to project from the sidewall of the base 102 in the circumference portion of the ramp 115. That is, the stage 117 is provided in the midst between the base bottom and the top cover 121 on the sidewall of the base 102. Accordingly, a space 118 is defined between the stage 117 and the base bottom, and a space 119 between the stage 117 and the top cover 121. Here, the stage 117 may be formed integral with the base 102, or may be formed separately and combined later. The space 118 and the space 119 are defined to thereby secure a flow passage between the ramp 115 and the sidewall of the base 102. This flow passage is adapted for air flowing from a region provided with the actuator 106 along the sidewall of the base 102 to a region provided with the magnetic disk 101.

Figure 8:
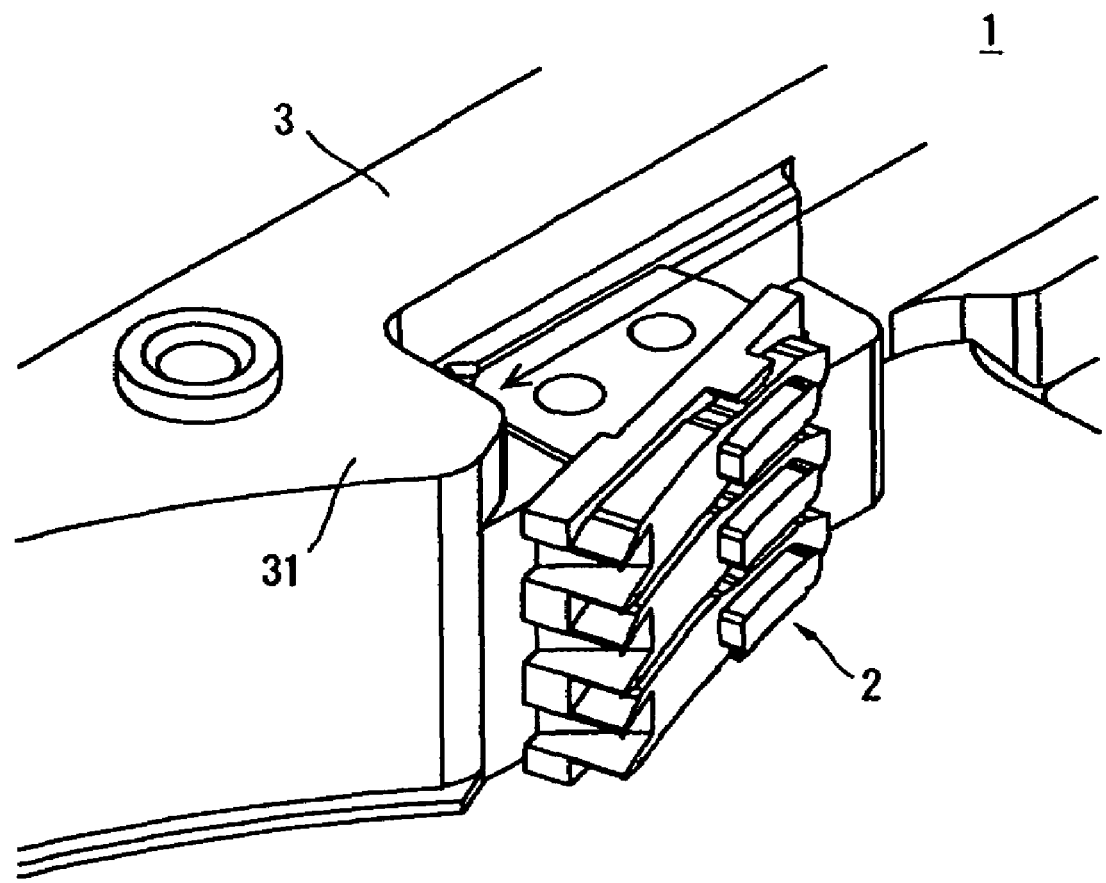
FIG. 8 is an enlarged perspective view showing a ramp and the neighborhood of a part to which the ramp is fixed in the prior art.
Figure 9:
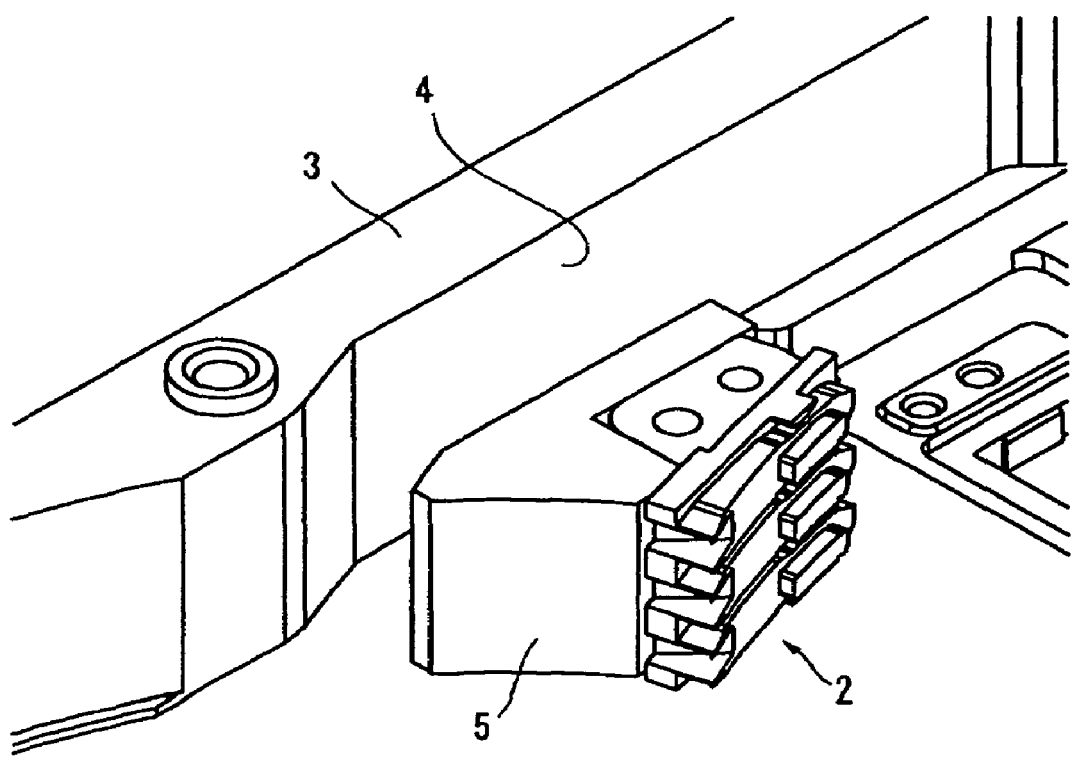
FIG. 9 is an enlarged perspective view showing a ramp and the neighborhood of a part to which the ramp is fixed in the reference art.

Further, in the conventional HDD, the area between the space 119 and the magnetic disk 101 is blocked by the convex portion 31 projecting from the side wall of the base 102 to inside of the HDD 1 along the outer circumferential shape of the magnetic disk 101, as shown in FIG. 8. However, in the present embodiment, part or whole of the convex portion 31 is removed in the range capable of maintaining its function by screwing or securing strength. In other words, the shape of the base 102 surrounding the circumference of the magnetic disk 101 in the vicinity of the ramp 115 is formed to provide a clearance between the ramp slope portion 150 and the base 102 in the upper surface 170 and the lower surface of the stage. With the configuration as described, a flow passage running from the space 119 and the space 118 toward the magnetic disk 101 is secured.

As shown in FIG. 3(*b*), a space 171 for housing the ramp support portion 151 is defined on the upper surface 170 of the stage, that is, the surface on the side of the top cover 121. The space 171 is provided below the upper surface 170 of the stage by one step. The height of the space 171 approximately coincides with the height of a portion fixed in the space 171 of the ramp support portion 151. Accordingly, when the ramp support portion 151 is fixed in the space 171, the upper surface 170 of the stage approximately coincides with the upper surface of the ramp support portion 151. With the configuration as described, the space 119 is not narrowed by the ramp support portion 151, but a flow passage can be secured between the side wall of the base 102 and the ramp slope portion 150.

Further, a slope portion 120 is formed at the end of the upper surface 170, that is, of the surface nearer the top cover 121 on the side of the magnetic disk 101. The slope portion 120 is formed to descend continuously as the inclined surface thereof comes closer to the magnetic disk 101 from the upper surface of the stage 117 to the lower surface of the stage 117. That is, in the slope portion 120, the width between the upper surface of the stage 117 and the lower surface of the stage 117, that is, the thickness of the stage 117 continuously reduces as it comes closer to the magnetic disk 101. Accordingly, in the slope portion 120, the height from the base bottom of the stage 117 continuously increases as it comes closer to the magnetic disk 101. In other words, the space 119 between the stage 117 and the top cover 121 continuously enlarges as it comes closer to the magnetic disk 101. That is, a flow passage at a part formed with the slope portion 120 of the space 119 enlarges as it comes closer to the magnetic disk 101.

With the structure as described, air flowing through the space 119 to the magnetic disk 101 is not blocked, so that a flow passage can be secured sufficiently. Further, in the slope portion 120, since the flow passage is enlarged continuously, the turbulence of airflow caused by sudden enlargement of the flow passage can be suppressed. Accordingly, it is possible to reduce the turbulence of air flowing toward the magnetic disk 101.

Figure 4:
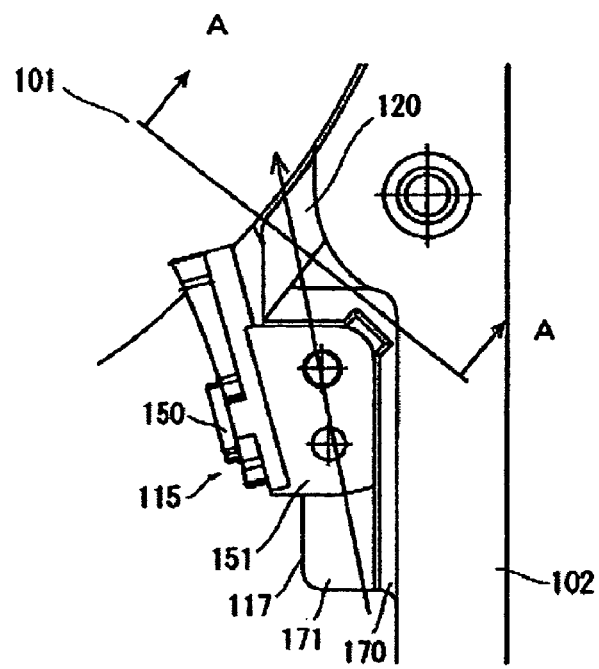
FIG. 4 is an enlarged plan view showing a ramp and the neighborhood of a part to which the ramp is fixed according to the embodiment of the present invention.

FIG. 4 is a plan view illustrating the circumference of the ramp 115 from above. Here, in FIG. 4, the magnetic disk 101 is also depicted. If the structure of the stage 117 in the present embodiment is used, air flowing along the sidewall of the base 102, passing between the ramp slope portion 150 and the sidewall of the base 102 and returning to the magnetic disk 101 passes through the space 119 and the inclined portion 120, flowing as indicated by the arrow shown in FIG. 4. Further, also air flows through the space 118, that is, the back of the stage 117, similarly to the arrow shown in FIG. 4. As shown by the arrow in FIG. 4, air passing between the base 102 and the ramp slope portion 150, that is, the space 119 and the space 118 flows without being interrupted toward the magnetic disk 101. Accordingly, the air flows through the space 119 and the space 118 toward the magnetic disk 101 without causing turbulence. As a result, it is possible to reduce the vibrations of the magnetic disk 101 and the actuator 106 above the magnetic disk 101 due to such airflow.

Figure 5:
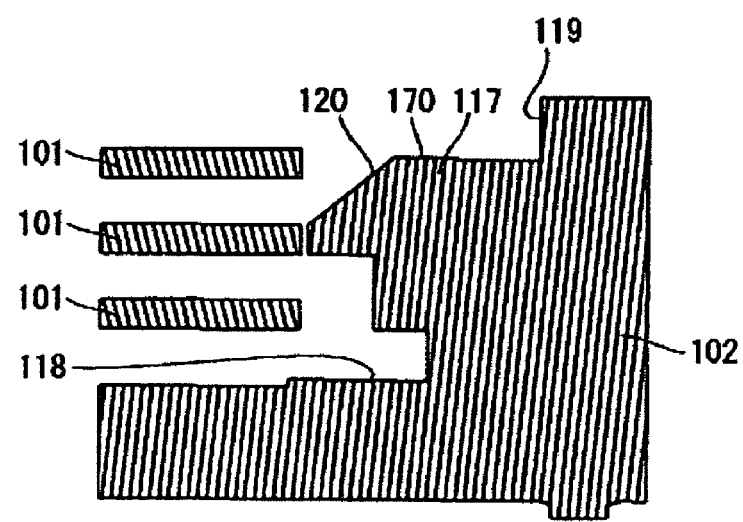
FIG. 5 is an enlarged sectional view showing a boundary portion between an inclined portion and a magnetic disk according to the embodiment of the present invention.

FIG. 5 is a sectional view taken on line A-A in FIG. 4. FIG. 5 shows the neighborhood of the boundary between the space 119 and space 118, and the magnetic disks 101, in which air flows from right to left in the figure. As shown in FIG. 5, the extreme end of the inclined portion 120 is located at a position lower (on the side of the base bottom) than the uppermost disk (on the side of the top cover 121) out of the plurality of magnetic disks 101, and higher (on the side of the top cover 121) than the lowermost disk (on the side of the base bottom) out of the plurality of magnetic disks 101.

Further, in the present embodiment, the extreme end of the inclined portion 120 is not aligned with the uppermost magnetic disk (on the side of the top cover 121) and the lowermost magnetic disk (on the side of the base bottom), but the magnetic disk located between the uppermost disk and the lowermost disk, as shown in the figure, (in the present embodiment, one located in the middle out of the three magnetic disks 101, hereinafter referred to as the central magnetic disk). More specifically, the extreme end (on the side of the top cover 121) of the inclined surface of the inclined portion 120 is aligned with the upper surface (on the side of the top cover 121) of the central magnetic disk 101, and the lower surface (on the side of the base bottom) of the extreme end of the inclined portion 120 is aligned with the lower surface (on the side of the base bottom) of the central magnetic disk 101.

To realize the above-described mode, preferably, the thickness of the extreme end portion of the inclined portion 120 is approximately equal with that of the magnetic disk 101, but it is not limited thereto. If the upper surface of the inclined portion 120 is aligned with the upper surface of the magnetic disk 101, air flowing toward the magnetic disk 101 through the space 119 smoothly flows to the upper surface of the magnetic disk 101 along the slope of the inclined portion 120. Further, if the lower surface of the inclined portion 120 is aligned with the lower surface of the magnetic disk 101, air flowing toward the magnetic disk 101 through the space 118 smoothly flows to the lower surface of the magnetic disk 101 along the lower surface of the inclined portion 120.

Even in either of the above cases, the effect thereof can be obtained, but if the upper surface of the inclined portion 120 is aligned with the upper surface of the magnetic disk 101, since the shape of the inclined portion 120 can be used well, it is preferable. Further, preferably, the thickness of the extreme end portion of the inclined portion is approximately equal with that of the magnetic disk 101 as described above. In addition, the slope and lower surface of the inclined portion are aligned with the upper surface and lower surface of the magnetic disk 101, respectively. With such a configuration as described, it is possible to reduce occurrence of flutter of the magnetic disk 101 (disk flutter) caused by air flowing toward the magnetic disk 101.

As described above, according to the HDD in the present embodiment, the turbulence of airflow returning to the magnetic disk along the neighborhood of the ramp portion, particularly the sidewall of the base, is reduced to thereby reduce flutter of the actuator caused by the airflow, and flutter of the magnetic disk (disk flutter). This makes it possible to improve the read/write performance.

In the present embodiment, the stage 117 is formed to project from the midst of the sidewall of the base 102. Accordingly, the space 119 and the space 118 are defined on the upper surface and the lower surface, respectively, and the flow passage running from the sidewall of the base 101 toward the magnetic disk 101 is secured. The flow passage is secured thereby to suppress the airflow from passing the area near the ramp 115 on the side of the actuator 106, whereby the reduction in flutter of the actuator 106 and the magnetic disk 101 is achieved. Here, even if only one of the space 118 and the space 119 is provided, its effect can be obtained, but both the space 118 and the space 119 are provided whereby its effect can be obtained more preferably.

Figure 6:
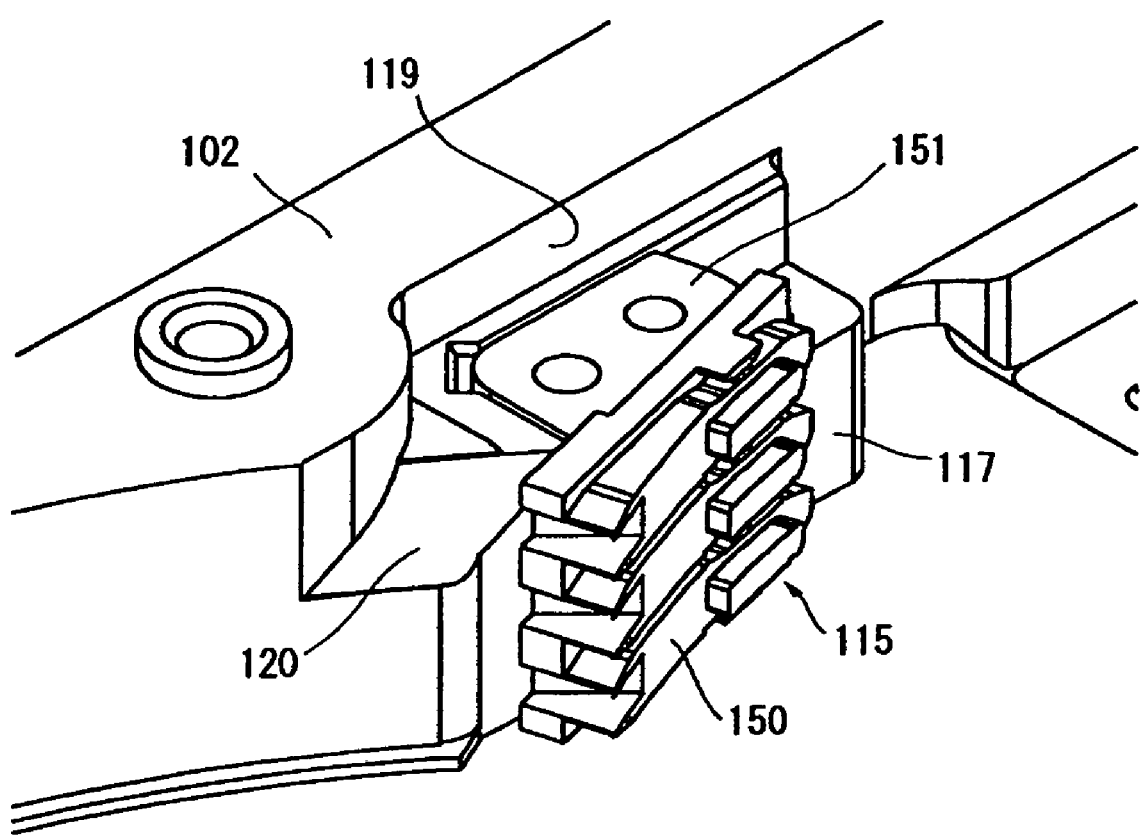
FIG. 6 is an enlarged perspective view showing a ramp and the neighborhood of a part to which the ramp is fixed according to the embodiment of the present invention.

FIG. 6 is an enlarged perspective view illustrating the ramp 115 of a HDD and the neighborhood thereof where only the space 119 is provided, according to another embodiment of the present invention. As shown in FIG. 6, a stage 117 may be formed to project from the sidewall of a base 102 and the base bottom without the space 118. Here, the stage 117 may be formed integral with the base 102, or may be formed separately from the base 102, and combined later.

No provision of the space 118 as described above allows the stage 117 to be continuous to the base bottom. Accordingly, unlike in the case where the extreme end of the inclined portion 120 is aligned with the central magnetic disk of a plurality of magnetic disks 101 as mentioned above, it is also possible that the inclined portion 120 be continuous to the base bottom. However, when an angle of the inclined portion 120 is excessively sharp, the flow passage is enlarged rapidly, and the inclined portion 120 substantially fails to perform a function as the inclined portion. This results in occurrence of turbulence of airflow. In such a case, the upper surface of the inclined portion 120 (on the side of the top cover 121) is aligned with the upper surface of the central magnetic disk or the lowermost magnetic disk 101 (on the side of the base bottom), whereby the effect of the inclined portion 120 can be obtained preferably.

Further, a forming position of the stage 117 can be lowered since the space 118 is not provided. By doing so, the space 119 can be enlarged, so that the flow passage of air flowing along the sidewall of the base 102 can be enlarged. Further, the stage upper surface 170 lowers, coming closer to the base bottom, and therefore, the width between the stage upper surface 170 and the base bottom is narrowed, making it possible that the inclined portion 120 is continuous to the base bottom.

Figure 7:
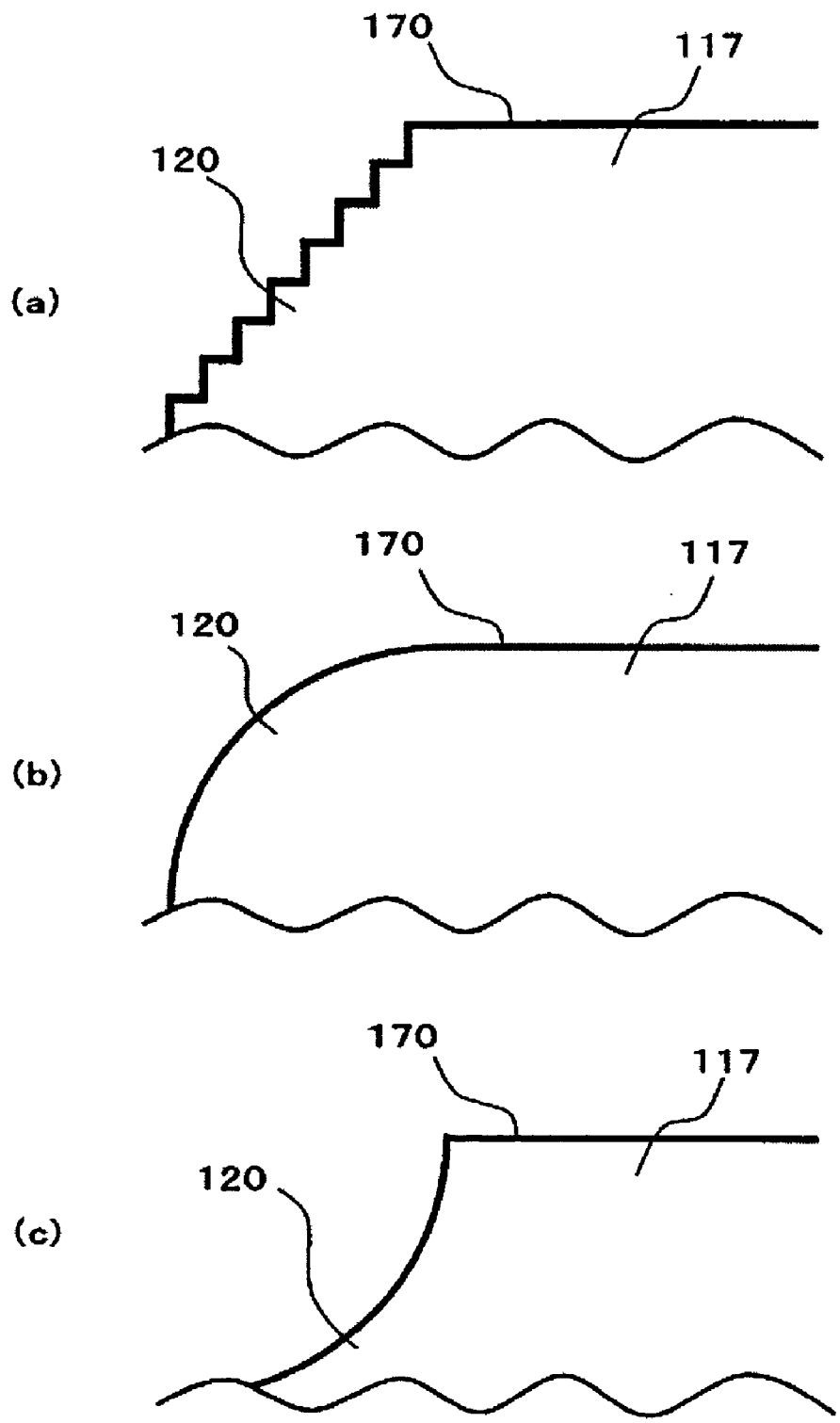
FIG. 7 is a schematic view showing the form of an inclined surface of an inclined portion according to the embodiment of the present invention.

Further, the slope of the inclined portion 120 is not limited to be straight shown in a sectional view of FIG. 5. FIG. 7 is a sectional view showing another mode of the slope of the inclined portion 120. The slope shape of the inclined portion 120 may be stepwise as shown in FIG. 7(a), or may be the shape with roundness as shown in FIGS. 7(b) and 7(c). In the stepwise slope shown in FIG. 7, the height of one step is made low and the width of one step is made wide, which can avoid rapid enlargement of the flow passage. The slope shown in FIG. 7(b) has a convex roundness, and the slope shown in FIG. 7(c) has a concave roundness. As shown in FIGS. 7(b) and 7(c), where the slope is rounded, its curvature is suitably adjusted to make it possible to avoid rapid enlargement of the flow passage. Further, the slope may have mixing of concave roundness and convex roundness. In the inclined portion 120, if the width of the stage 117 is continuously reduced, the shape of the slope surface is not limited to a plane.

In the present embodiment, the stage 117 is provided on the base 102, which is, however, not restrictive. The stage 117 may be provided on the surface of the top cover 121 inside the HDD 1, and the ramp support portion 151 can be also fixed to the stage 117. In such a case, the ramp 115 is fixed upward (on the side of the top cover 121) instead of downward (on the side of the base bottom). Accordingly, the space 119 is not present reversely to the mode shown in FIG. 6, and only the space 118 can be provided. Also in such a case, the inclined portion 120 is provided on the end of the stage 117 on the side of the magnetic disk 101 whereby the effect of the present invention can be obtained.

While in the present embodiment, a description has been made of an example of a hard disk drive using a magnetic disk as a disk drive, the invention is not limited thereto. The invention is also applicable to, for example, an optical type disk drive having an optical type recording medium internally, or a disk drive in which an optical type recording medium is housed internally to read information recorded in the medium. As long as a disk drive can support a disk type recording medium, its recording method is not particularly limited.

In the present embodiment, a description has been made that the head 105 provided on the actuator 106 is an element for performing read/write, the invention is not limited thereto. The present invention can be applied also to the case where the head 105 performs either reading or writing. Further, an actuator provided with a head for performing reading and an actuator provided with a head for performing writing may be provided separately.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A disk drive comprising:
   an enclosure having a base and a top cover fixed to said base;
   a motor arranged internally of said base to rotate a recording disk;
   an actuator holding a head getting access to said recording disk, said actuator being turned to thereby move the head;
   a ramp slope portion which is located beside said recording disk, and on which an extreme end of said actuator is ridden up in order to move said head outside said recording disk;
   a ramp support portion configured to support said ramp slope portion; and
   a stage provided in said enclosure and configured to attach said ramp support portion thereto;

wherein a flow passage configured to receive air circulating around the rotating recording disk, is defined between said ramp slope portion and said enclosure, and an inclined surface running toward a base bottom of said base is formed on an end of the flow passage on a side of said recording disk, and wherein said stage is formed integral with said enclosure.

2. The disk drive according to claim 1, wherein said inclined portion is a slope whose height from said base bottom reduces continuously.

3. The disk drive according to claim 2, wherein:
a plurality of recording disks are fixed to said motor; and
an extreme end of said slope is positioned at a height between a surface of a recording disk closest to said top cover out of the plurality of recording disks coupled to said motor and a surface of a recording disk closest to said base bottom out of the plurality of recording disks.

4. The disk drive according to claim 3, wherein the extreme end of said slope is positioned at the height which substantially corresponds to the surface, of the recording disk coupled to said motor, on the side of the top cover.

5. The disk drive according to claim 2, wherein said slope is formed on an end of the stage on the side of said recording disk.

6. The disk drive according to claim 1, wherein a flow passage provided for an airflow returning to the recording disk is formed between said stage and said base bottom.

7. A disk drive comprising:
an enclosure having a base and a top cover fixed to said base;
a motor arranged internally of said base to rotate a recording disk;
an actuator holding a head getting access to said recording disk, said actuator being turned to thereby move the head;
a ramp which is located beside said recording disk, and on which an extreme end of said actuator is ridden up in order to move said head outside said recording disk; and
a stage provided in said enclosure and configured to attach said ramp thereto;
wherein a flow passage configured to receive air circulating around the rotating recording disk, is defined between the ramp and the stage in an area near said stage on a side of a base bottom of side base, the flow passage including an inclined portion extending toward the bottom; and wherein said stage is formed integral with said enclosure.

8. The disk drive according to claim 7, wherein said ramp comprises a ramp slope portion on which an extreme end of said actuator is ridden up, and a ramp support portion supporting said ramp slope portion and attached to said stage.

9. The disk drive according to claim 8, wherein a flow passage through which air flows toward said recording disk through an area near said ramp support portion and said stage on a side of said top cover is formed between said ramp slope portion and a base sidewall of said base, and a slope whose height from said base bottom reduces continuously in a direction toward said recording disk is formed on an end of said flow passage on a side of said recording disk.

10. The disk drive according to claim 9, wherein:
a plurality of recording disks are fixed to said motor; and
an extreme end of said slope is positioned at a height between a surface of a recording disk closest to said top cover out of the recording disks fixed to said motor and a surface of a recording disk closest to said base bottom out of the recording disks.

11. The disk drive according to claim 10, wherein the extreme end of said slope is positioned at the height which substantially corresponds to the surface, of the recording disk coupled to said motor, on the side of the top cover.

12. The disk drive according to claim 9, wherein said slope is formed on an end of the stage on the side of the recording disk.

13. The disk drive according to claim 9, wherein the slope is convex.

14. The disk drive according to claim 9, wherein the slope is convex.

15. The disk drive according to claim 9, wherein the slope comprises a plurality of steps.

16. The disk drive according to claim 7, wherein a flow passage provided for an airflow returning to the recording disk is formed between said stage and said base bottom.

17. The disk drive according to claim 16, wherein the flow passage between said stage and said base bottom is formed between said base bottom and a slope on an end of said stage on the side of said recording disk.

18. The disk drive according to claim 17, wherein the slope has a height which increases continuously from said base bottom in a direction toward said recording disk.

* * * * *

UNITED STATES PATENT AND TRADEMARK OFFICE
CERTIFICATE OF CORRECTION

PATENT NO. : 7,576,945 B2  Page 1 of 1
APPLICATION NO. : 11/304398
DATED : August 18, 2009
INVENTOR(S) : Kanada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 557 days.

Signed and Sealed this

Seventh Day of September, 2010

David J. Kappos
*Director of the United States Patent and Trademark Office*